No. 703,331. Patented June 24, 1902.
W. T. ACREE.
FRUIT CORER AND CUTTER.
(Application filed July 22, 1901.)
(No Model.)
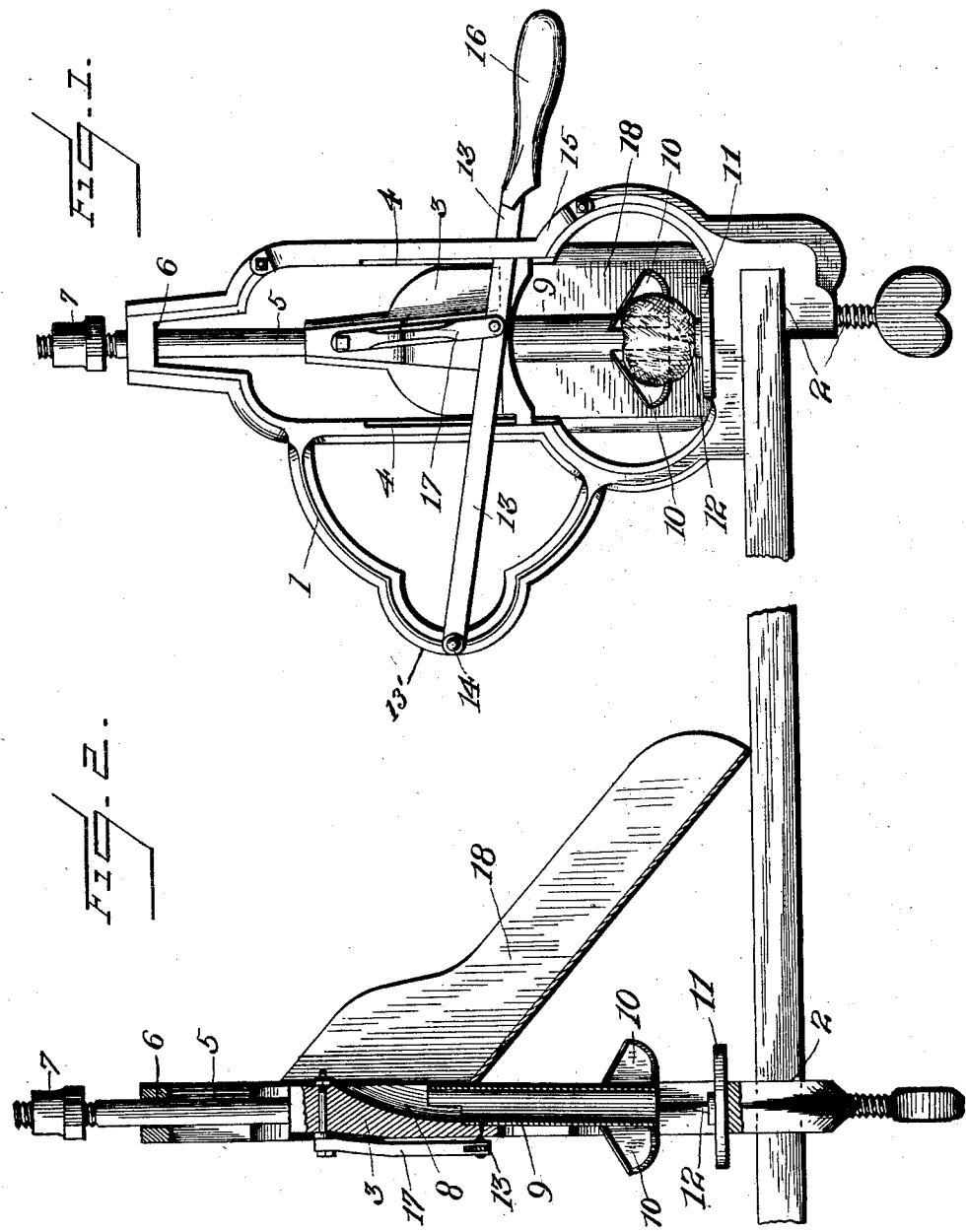

UNITED STATES PATENT OFFICE.

WILLIAM T. ACREE, OF GAINESBORO, TENNESSEE.

FRUIT CORER AND CUTTER.

SPECIFICATION forming part of Letters Patent No. 703,331, dated June 24, 1902.

Application filed July 22, 1901. Serial No. 69,295. (No model.)

*To all whom it may concern:*

Be it known that I, WILLIAM TRAVIS ACREE, a citizen of the United States, residing at Gainesboro, in the county of Jackson and State of Tennessee, have invented certain new and useful Improvements in Fruit Corers and Cutters; and I do declare the following to be a full, clear, and exact description of the invention, such as will enable others skilled in the art to which it appertains to make and use the same.

This invention relates to improvements in fruit cutters and corers.

The object of the invention is to provide a device for coring and cutting fruit, particularly apples, which shall be simple of construction, easy to operate, and adapted to core and cut up the apple into any desired number of parts and to discharge the core and parts into suitable receptacles.

In the accompanying drawings, Figure 1 is a front elevation of a fruit cutter and corer constructed in accordance with my invention, and Fig. 2 is a vertical section of the same.

Referring to the drawings, the numeral 1 designates an open frame of suitable construction having at its lower end a clamping attachment 2 for connecting the said frame with a bench, table, or other like support. Mounted to reciprocate vertically in the frame is a plunger 3, which traverses guides 4, formed upon the parallel side bars, and is connected at its upper end with a stem 5, which slides within a guide-opening 6, formed in the upper end of the frame, and has attached thereto an adjusting-nut 7. The plunger is formed with a discharge passage or channel 8 and has attached thereto a tubular cutter or corer 9, which communicates at its upper end with said channel and is beveled at its lower end to form a cutting edge to pass through the apple and separate the core therefrom. The tubular corer or cutter 9 carries at its lower end a series of blades 10, which are adapted as the cutter is forced down to remove the core to simultaneously cut up the apple into any desired number of sections or pieces. The base portion of the frame is formed or provided with a bed-plate 11, adapted to support the fruit, which plate is provided with a spur, pin, or prong 12 to enter the apple and hold it in position while the corer and cutters are acting thereon. An operating-lever 13 is pivoted to a lateral extension 13' of the frame upon a pivot pin or bolt 14 and works at its opposite end in a suitable guide 15 on one of the side bars of the frame and is provided with an operating-handle 16. A link 17 connects the lever with the plunger 3 and reciprocates said plunger and the cutters attached thereto vertically within the frame 1 upon the operation of the lever. A chute 18 is connected with the rear side of the parallel side bars of the frame in advance of the plunger 3 and is adapted to receive the cores forced through the upper portion of the corer 9 and channel 8.

In operation the apple is placed upon the bed-plate 11 and forced down upon the pin 12, which centers it to hold it in position while being operated upon by the cutters. The lever-handle 16 is forced down to cause a corresponding downward movement of the plunger and cutter. Upon the downward movement of the cutters the tubular cutter or corer 9 passes down through the center of the apple and removes or cuts out the core, while the radial blades 10 separate the apple into a number of parts or sections, which drop down into a pan or suitable receptacle (not shown) arranged upon the bench or table upon which the device is supported. The cores removed from the apple are one after the other successively forced up through the tubular cutter or corer 9 and are first discharged into the channel 8 of the plunger 3, and thence as the plunger moves up and down discharge into the chute 18, which conducts them to a suitable receptacle.

Any desired number of blades 10 may be employed, and the device may be provided with a series of interchangeable corers 9, each differing from one another in the number of blades 10, so as to provide for the cutting or separation of the apple into any number of parts.

By means of the adjusting-nut 7 the downward movement of the plunger and cutting-blades may be controlled to a nicety to arrest the action of the blades upon the cutting edges thereof coming into contact with the bed-plate 11, so as to prevent said blades from being unduly worn and quickly dulled by their constant action against the plate.

From the foregoing description, taken in connection with the accompanying drawings, the construction, mode of operation, and advantages of the invention will be readily understood without a further extended description.

Changes in the form, proportion, and minor details of construction may be made within the scope of the invention without departing from the spirit or sacrificing any of the advantages thereof.

Having thus described my invention, what I claim, and desire to secure by Letters Patent, is—

In a fruit corer and cutter the combination of the frame having guideways therein, a lateral extension on said frame, a stem with a screw-threaded upper portion vertically movable in an opening in the top of the frame, a plunger secured to the stem and movably mounted in said guideways, a corer with cutters secured to the plunger and vertically movable therewith, a chute secured to the frame in advance of the plunger to coact with the corer, a nut on the screw-threads of the stem for adjusting the movements of the same, a lever mounted in a guide of the frame and pivoted to the extension, and a vertically-vibrating endwise-movable link pivoted to said plunger and said lever, substantially as specified.

In testimony whereof I have hereunto set my hand in presence of two subscribing witnesses.

W. T. ACREE.

Witnesses:
J. P. POLSON,
J. A. WILLIAMS.